US009111472B2

(12) United States Patent
Cho et al.

(10) Patent No.: US 9,111,472 B2
(45) Date of Patent: Aug. 18, 2015

(54) LIGHT-EMITTING DIODE MODULE, BACKLIGHT ASSEMBLY HAVING THE LED MODULE AND DISPLAY DEVICE HAVING THE BACKLIGHT ASSEMBLY

(75) Inventors: Joo-Woan Cho, Asan-si (KR);
Yong-Woo Lee, Suwon-si (KR);
Hyoung-Joo Kim, Anyang-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 932 days.

(21) Appl. No.: 13/224,169

(22) Filed: Sep. 1, 2011

(65) Prior Publication Data

US 2012/0224119 A1 Sep. 6, 2012

(30) Foreign Application Priority Data

Mar. 4, 2011 (KR) ........................ 10-2011-0019537

(51) Int. Cl.
*G02F 1/1335* (2006.01)
*F21V 7/04* (2006.01)
*G09F 13/22* (2006.01)

(52) U.S. Cl.
CPC .......... *G09F 13/22* (2013.01); *G02F 1/133608* (2013.01); *G02F 1/133603* (2013.01); *G02F 2001/133612* (2013.01)

(58) Field of Classification Search
CPC ...................... G02F 2001/133612; G09F 13/22
USPC .............................. 349/61–65; 362/612, 634
See application file for complete search history.

(56) References Cited

U.S. PATENT DOCUMENTS

| 2008/0225532 | A1* | 9/2008 | Kokubu et al. ............... 362/368 |
| 2008/0316767 | A1* | 12/2008 | Woo et al. ..................... 362/612 |
| 2010/0165237 | A1* | 7/2010 | Jung ............................... 349/58 |
| 2011/0007236 | A1* | 1/2011 | Kim et al. ........................ 349/58 |

FOREIGN PATENT DOCUMENTS

| JP | 2007-311639 | 11/2007 |
| KR | 10-0892424 | 4/2009 |
| KR | 10-2010-0055748 | 5/2010 |

OTHER PUBLICATIONS

English Abstract for Publication No. 2007-311639.
English Abstract for Publication No. 10-0892424.
English Abstract for Publication No. 10-2010-0055748.

* cited by examiner

*Primary Examiner* — Paul Lee
(74) *Attorney, Agent, or Firm* — F. Chau & Associates, LLC

(57) ABSTRACT

A backlight assembly includes a light-emitting diode (LED) module and a bottom chassis. The LED module includes an LED package in which at least one LED chip is mounted, and first and second wire sockets respectively making contact with lead frames formed at two sides of the LED package. The bottom chassis has a coupling hole formed through a bottom portion for receiving a coupling hook of the LED module. Thus, a wire socket is configured to make contact with a lead frame formed at a side portion of an LED package and power is received through a wire inserted through the wire socket, so that an additional printed circuit board (PCB) or an additional flexible printed circuit board (FPCB) for providing the LED package with power may be omitted.

20 Claims, 10 Drawing Sheets

LIGHT-EMITTING DIODE MODULE, BACKLIGHT ASSEMBLY HAVING THE LED MODULE AND DISPLAY DEVICE HAVING THE BACKLIGHT ASSEMBLY

CROSS-REFERENCE TO RELATED APPLICATIONS

This application claims priority under 35 U.S.C. §119 to Korean Patent Application No. 10-2011-0019537, filed on Mar. 4, 2011 in the Korean Intellectual Property Office (KIPO), the contents of which are herein incorporated by reference in their entirety.

BACKGROUND

1. Technical Field

The present invention relates to a light-emitting diode (LED) module, and more particularly, to an LED module, a backlight assembly having the LED module and a display device having the backlight assembly.

2. Discussion of the Related Art

Generally, as liquid crystal display (LCD) panels do not produce light but rather provide an image by blocking light, an LCD display device includes a backlight assembly supplying the LCD panel with light. Many backlight assemblies have traditionally used a fluorescent light source such as a cold cathode fluorescent lamp (CCFL), however, it is becoming increasingly common to use a backlight assembly comprising one or more light emitting diodes (LEDs). Backlight assemblies having light-emitting diodes (LEDs) are widely used for display devices such as mobile LCD devices of mobile communication terminals, digital cameras and computer monitors. A backlight assembly having an LED light source may have a light weight, a thin profile, and other beneficial characteristics.

LED backlight assemblies may provide for either direct illumination or edge illumination. In a direct illumination type display device, the LED of the backlight assembly is disposed behind the display panel from the point of view of a viewer watching the display device. In an edge illumination type display device, the LED of the backlight assembly is disposed adjacent to a side of a light guide plate (LGP) and the LGP guides light from the side of the backlight assembly along the back of the display panel. The edge illuminated LED backlight may include a plurality of LEDs arrayed on a flexible printed circuit board (FPCB) having circuit lines printed on a flexible resin film.

Some of the light produced by the edge illuminated LED backlight might fail to be directed correctly to the desired location behind the LCD panel. This light that is not correctly guided is considered light leakage. Accordingly, some modern edge illuminated LED backlights include light-controlling technology to decrease the leakage of the light emitted from the LED and to guide the light toward an effective display area. This light-controlling technology may add to the structure of the backlight and may accordingly increase cost and manufacturing complexity associated with edge illuminated LED backlight LCD devices.

Additionally, the FPCB on which the LED is mounted may be a source of light leakage. It is also possible for optical sheets to lift away from the LGP and such an occurrence may deteriorate the image quality of the display device.

SUMMARY

Exemplary embodiments of the present invention provide a light-emitting diode (LED) backlight module capable of reducing a manufacturing cost of a backlight assembly by reducing a number of printed circuit boards (PCBs) used and/or reducing a number of flexible printed circuit boards (FPCBs) used in providing power to an LED employed in the backlight assembly.

Exemplary embodiments of the present invention provide a backlight assembly having the above-mentioned LED module.

Exemplary embodiments of the present invention provide a display device having the above-mentioned backlight assembly.

According to one aspect of the present invention, an LED module includes an LED package and first and second wire sockets. The LED package has at least one LED chip mounted thereon. The first and second wire sockets respectively make contact with lead frames formed at two sides of the LED package.

According to an aspect of the present invention, a backlight assembly includes an LED module and a bottom chassis. The LED module includes an LED package in which at least one LED chip is mounted, and first and second wire sockets respectively making contact with lead frames formed at two sides of the LED package. The bottom chassis has a coupling hole formed through a bottom portion for a hook coupling of the LED module.

According to an aspect of the present invention, a display device includes an LCD panel and a backlight assembly providing the LCD panel with light. The backlight assembly includes an LED module and a bottom chassis. The LED module includes an LED package in which at least one LED chip is mounted, and first and second wire sockets respectively making contact with lead frames formed at two sides of the LED package. The bottom chassis has a coupling hole formed through a bottom portion for a hook coupling of the LED module.

According to an aspect of the present invention, an LED module, a backlight assembly having the LED module and a display device having the backlight assembly, may utilize a wire socket configured to make contact with a lead frame formed at a side portion of an LED package. Power is received through a wire inserted through the wire socket and an additional PCB or an additional FPCB for providing the LED package with power may be omitted. Therefore, a manufacturing cost of a backlight assembly or a display device may be reduced.

BRIEF DESCRIPTION OF THE DRAWINGS

The above and other features and aspects of the present invention will become more apparent by describing in detailed exemplary embodiments thereof with reference to the accompanying drawings, in which.

DETAILED DESCRIPTION OF THE EMBODIMENTS

Hereinafter, exemplary embodiments of the present invention will be explained in detail with reference to the accompanying drawings.

Figure 1:
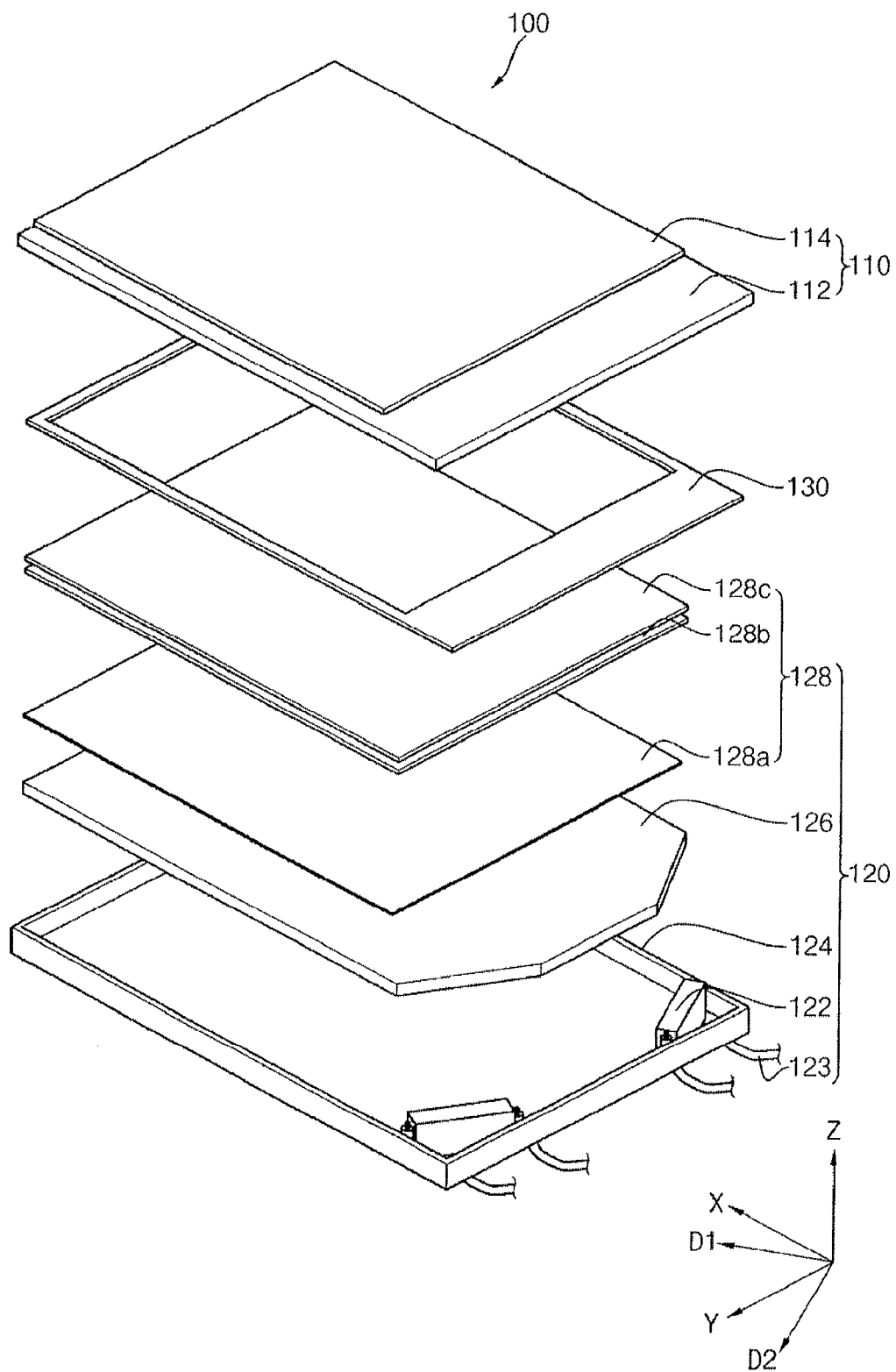
FIG. 1 is an exploded perspective view schematically illustrating a display device according to an exemplary embodiment of the present invention.

FIG. 1 is an exploded perspective view schematically illustrating a display device according to an exemplary embodiment of the present invention.

Referring to FIG. 1, a display device 100 according to an exemplary embodiment of the present invention includes a liquid crystal display (LCD) panel 110 and a backlight assembly 120.

The LCD panel 110 includes a first substrate 112, a second substrate 114 facing the first substrate 112 and a liquid crystal layer (not shown) disposed between the first and second substrates 112 and 114. The first substrate 112 may be an array substrate on which plural switching elements and plural pixel electrodes are arranged. The second substrate 114 may be a color filter substrate on which plural color filters, a common electrode, etc., are arranged.

A top chassis (not shown) may be further disposed on the LCD panel 110 to protect the LCD panel 110 from an external impact. A window may be formed through an upper portion of the top chassis to expose a display area of the LCD panel 110.

The backlight assembly 120 includes at least one light-emitting diode (LED) module 122, a bottom chassis 124, a light guide plate (LGP) 126 and one or more optical sheets 128.

The LED module 122 includes an LED package on which at least one LED chip is mounted, a first wire socket making contact with a first side of the LED package, and a second wire socket making contact with a second side of the LED package. The LED module 122 may be disposed at a corner portion of the bottom chassis 124.

The bottom chassis 124 includes a bottom portion and plural sidewalls extended from edges of the bottom portion to form a receiving space. The bottom chassis 124 receives the LED module 122, the LGP 126 and the optical sheets 128. At least one coupling hole for coupling the LED module 122 is formed through the bottom portion of the bottom chassis 124. Moreover, at least one wire hole for penetrating a wire 123 providing power to the LED module 122 may be formed through the bottom portion of the bottom chassis 124.

The LGP 126 guides light emitted from an LED chip of the LED module 122 to provide the optical sheets 128 with the guided light. A long side of the LGP 126 is substantially in parallel with an x-axis. Two edge portions of the LGP 126 are chamfered to define a light incident portion. In FIG. 1, one LED module is disposed at one light incident portion, and one LED module is disposed at another light incident portion. Each of the LED modules may be disposed toward a substantial diagonal line of the LGP 126. The LGP 126 includes a polymer resin having various characteristics such as a high light transmittance, a high heat resistance, a high chemical resistance, a high mechanical strength, etc. Examples of the polymer resin that may be used for the LGP 126 may include polymethylmethacrylate, polyamide, polyimide, polypropylene, polyurethane, etc. These may be used alone or in a combination with each other.

The optical sheets 128 are disposed on the LGP 126 and increase an efficiency of light incident from the LGP 128. The optical sheets 128 may include a diffusion sheet 128a, a first prism sheet 128b and a second prism sheet 128c. The first prism sheet 128b may include plural prisms aligned in a first direction, and the second prism sheet 128c may include plural prisms aligned in a second direction crossing the first direction. For example, the first direction may be substantially perpendicular to the second direction when viewed from a plan view.

The display device 100 may further include a mold frame 130. The mold frame 130 is disposed between the LCD panel 110 and the optical sheets 128 to support the LCD panel 110 together with the bottom chassis 124. The mold frame 130 may fix the LGP 126 and the optical sheets 128 to the bottom chassis 124.

A reflection sheet (not shown) may be further disposed between the LGP 126 and the bottom chassis 124. The reflection sheet may reflect light that exits through a rear surface of the LGP 126 so that this light may be effectively used to illuminate the LCD panel 110.

In FIG. 1, it is shown that the wires 123 are respectively penetrated through two wire holes formed through a bottom portion of the bottom chassis 124, so that the LED module 122 is connected to an external power supplying device through the wires 123. Alternatively, when the power providing device is disposed at the bottom chassis 124, the two wire holes may be omitted.

Moreover, in FIG. 1, it is described that two coupling holes for connecting the LED and two wire holes for providing power are formed through the bottom chassis 124 in correspondence with one LED module 122. Alternatively, two coupling holes for connecting the LED and one wire hole for providing power may be formed through the bottom chassis 124.

According to an exemplary embodiment of the present invention, an LED module is directly coupled to a bottom chassis of a backlight assembly in correspondence with an edge portion of an LGP which is chamfered, so that a PCB or an FPCB that is equipped to provide an LED with power may be omitted. Thus, a manufacturing cost of a backlight assembly or a display device may be reduced.

Moreover, a hook member is disposed on an LED module so as to couple the LED module and the bottom chassis, so that heat generated from the LED module may be irradiated or otherwise transferred to the bottom chassis through the hook member.

Figure 2:
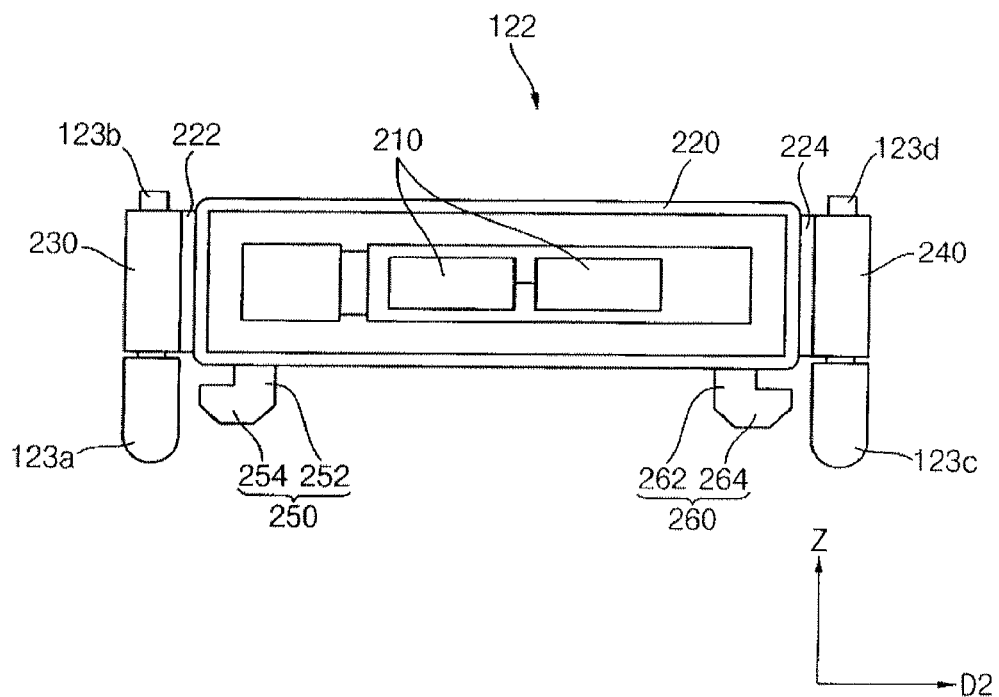
FIG. 2 is a plan view illustrating a light-emitting diode (LED) module of FIG. 1.
Figure 3:
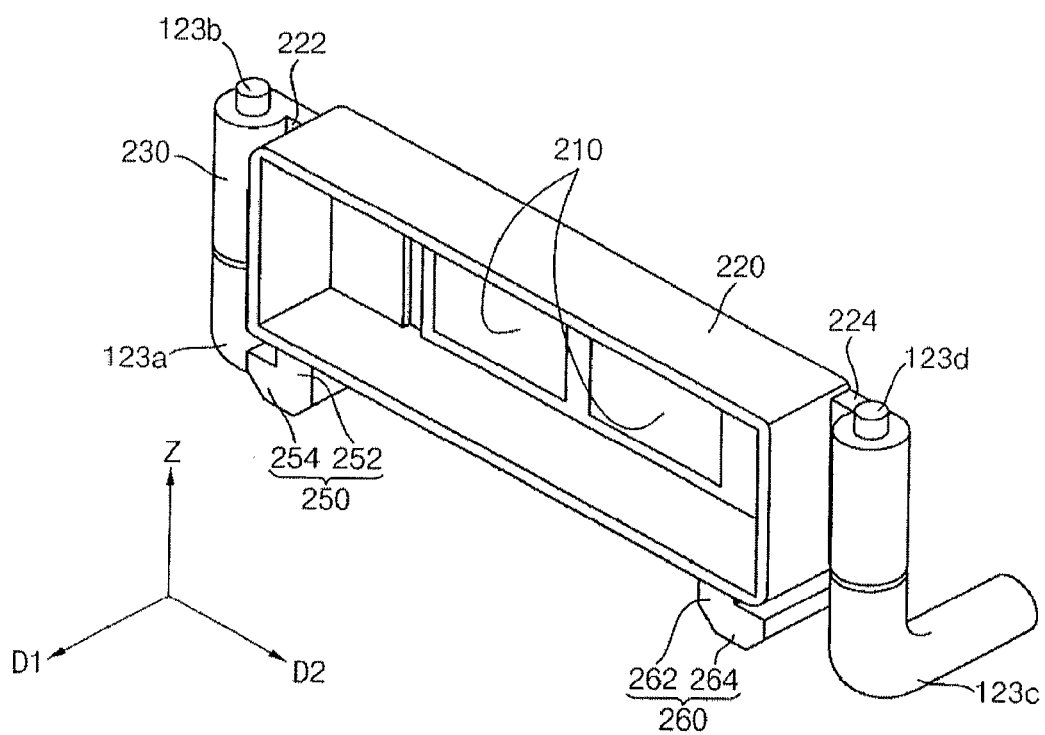
FIG. 3 is a perspective view illustrating an LED module of FIG. 1.

FIG. 2 is a plan view illustrating an LED module of FIG. 1. FIG. 3 is a perspective view illustrating an LED module of FIG. 1.

Referring to FIGS. 2 and 3, the LED module 122 includes an LED package 220, a first lead frame 222, a second lead frame 224, a first wire socket 230, a second wire socket 240, a first hook 250 and a second hook 260. The first and second hooks 250 and 260 may define a hook member.

At least one LED chip 210 is mounted on the LED package 220.

The first lead frame 222 is formed at a first side of the LED package 220 and forms a path for providing power to the LED chip 210.

The second lead frame 224 is formed at a second side of the LED package 220 and forms a path for providing power to the LED chip 210.

The first wire socket 230 makes contact with the first lead frame 222. The first wire socket 230 is electrically connected to a first wire which provides a first power to the LED chip 210. The first wire includes a first sheathing portion 123a providing electrical isolation from an external portion and the first wire includes a first conductive line 123b disposed within the first sheathing portion 123a. The first conductive line 123b is inserted into the first wire socket 230. Thus, power provided from an external power supplying apparatus (not shown) is provided to the LED chip 210 via the first conductive line 123b, the first wire socket 230 and the first lead frame 222.

The second wire socket 240 makes contact with the second lead frame 224. The second wire socket 240 is electrically connected to a second wire which provides a second source of power to the LED chip 210. The second wire includes a second sheathing portion 123c for an electrical isolation from an external portion and a second conductive line 123d disposed within the second sheathing portion 123c. The second conductive line 123d is inserted into the second wire socket 240. Thus, power provided from an external power supplying apparatus (not shown) is provided to the LED chip 210 via the second conductive line 123d, the second wire socket 240 and the second lead frame 224.

The first hook 250 is adjacent to the first wire socket 230 below the LED package 220. The first hook 250 may include a material having an elasticity to include a first hook guide 252 and a first hook base 254. The first hook guide 252 is formed toward a downward direction of the LED package 220. The first hook base 254 is connected to an end portion of the first hook guide 252 to be extended toward the first wire socket 230 in parallel with a rear surface of the LED package 220.

The second hook 260 is adjacent to the second wire socket 240 below the LED package 220. The second hook 260 may include a material having an elasticity to include a second hook guide 262 and a second hook base 264. The second hook guide 262 is formed toward a downward direction of the LED package 220. The second hook base 264 is connected to an end portion of the second hook guide 262 to be extended toward the second wire socket 240 in parallel with a rear surface of the LED package 220.

Figure 4A:
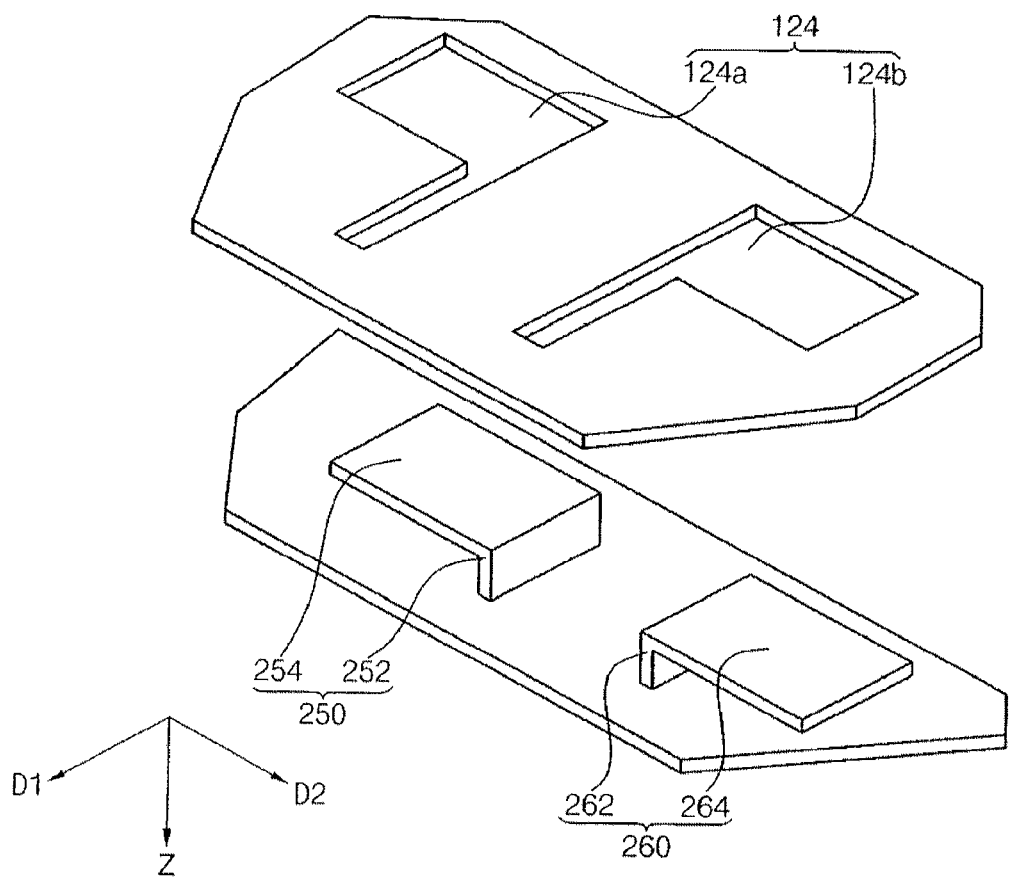
FIG. 4A is an exploded perspective view illustrating an example of coupling holes formed through a bottom chassis of FIG. 1 and a hook member of an LED module combined with the coupling hole.
Figure 4B:
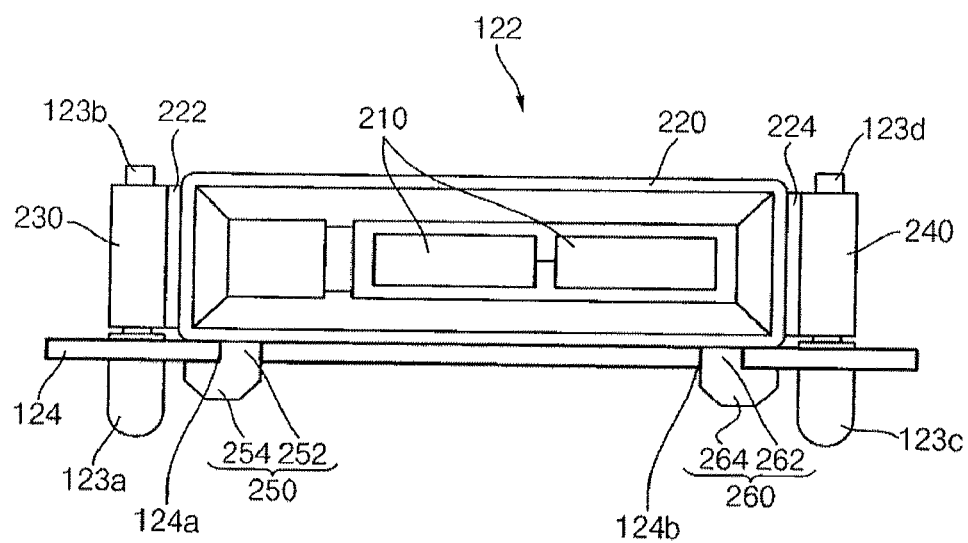
FIG. 4B is a side view illustrating an LED module combined with a coupling hole of FIG. 4A.

FIG. 4A is an exploded perspective view illustrating an example of coupling holes 124a and 124b formed through a bottom chassis 124 of FIG. 1 and a hook member of an LED module combined with the coupling hole. FIG. 4B is a side view illustrating an LED module combined with a coupling hole of FIG. 4A.

Referring to FIGS. 1, 4A and 4B, a first coupling hole 124a for coupling with the first hook 250 of the LED module 122 and a second coupling hole 124b for coupling with the second hook 260 of the LED module 122 are formed through a bottom portion of the bottom chassis 124.

When viewed on a plan view, the first coupling hole 124a has an L-shape, and the second coupling hole 124b has an inversed L-shape. The first coupling hole 124a and the second coupling hole 124b are in mirror symmetry with respect to a first direction axis D1.

Each of the first and second coupling holes 124a and 124b includes a first area respectively corresponding to the first and second hook bases 254 and 264 and a second area extended from the first area. A width of the second area may correspond to a thickness of the first hook guide 252 or a thickness of the second hook guide 262.

A first hook 250 corresponding to the first coupling hole 124a and a second hook 260 corresponding to the second coupling hole 124b are formed through a rear surface portion of the LED module 122. The first hook 250 includes a first hook guide 252 protruded in a z-axis direction and a first hook base 254 extended from the first hook guide 252 toward an opposition direction of a second direction D2.

The second hook 260 includes a second hook guide 262 protruded in a z-axis direction and a second hook base 264 extended from the second hook guide 262 toward the second direction D2.

The first and second hook bases 254 and 264 are inserted into first areas of the first and second coupling holes 124a and 124b, respectively, to be disposed on the second areas, so that the LED module 122 may be coupled with the bottom chassis 124. For example, the first and second hook guides 252 and 262 are fixed by each of the second areas having a width narrower than a width of the first area.

After the first and second hook guides 252 and 262 are moved from the second area to the first area, the LED module 122 may be separated from the bottom chassis 124 through the first area.

Figure 5:
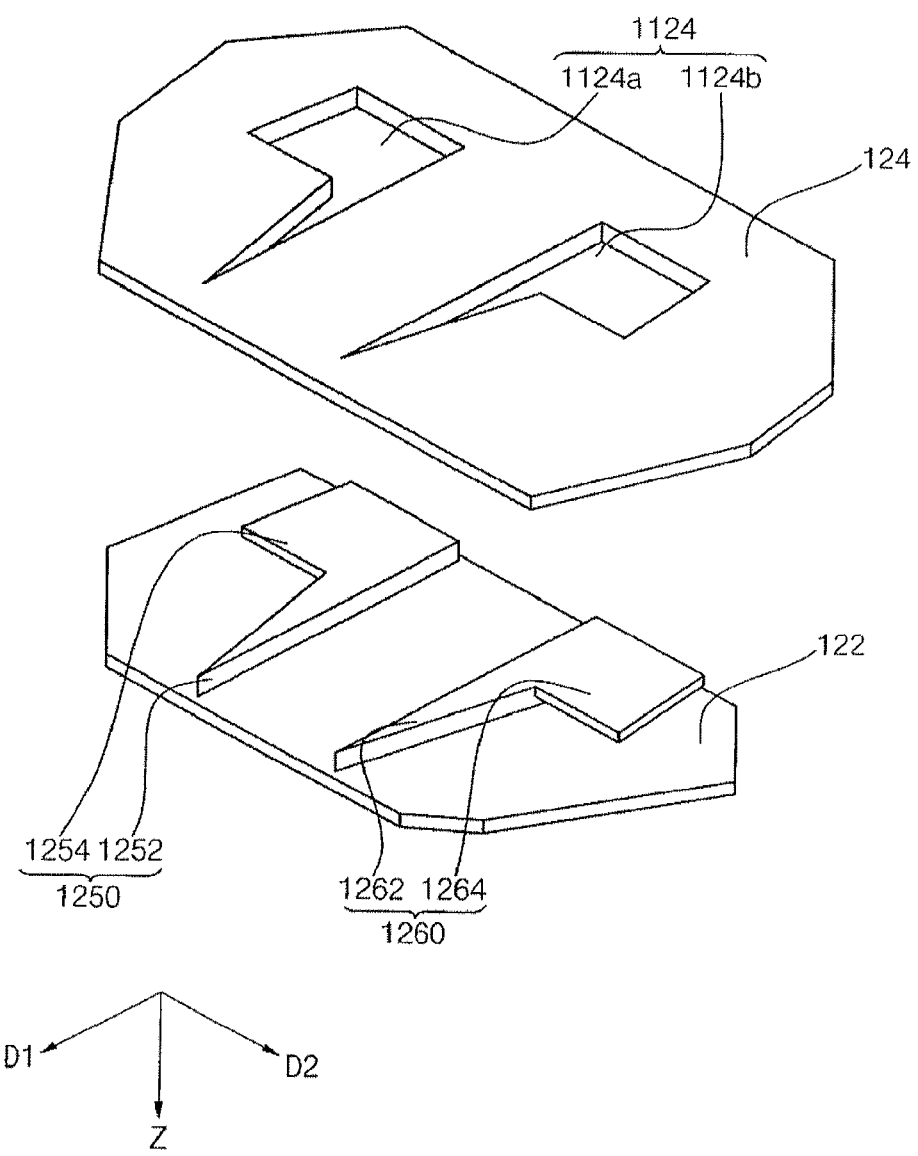
FIG. 5 is an exploded perspective view illustrating an example of a coupling hole formed through a bottom chassis of FIG. 1 and a hook member of an LED module combined with the coupling hole.

FIG. 5 is an exploded perspective view illustrating an example of a coupling hole formed through a bottom chassis of FIG. 1 and a hook member of an LED module combined with the coupling hole.

Referring to FIG. 5, a first coupling hole 1124a for coupling with the first hook 1250 of the LED module 122 and a second coupling hole 1124b for coupling with the second hook 1260 of the LED module 122 are formed through a bottom portion of the bottom chassis 124. The first coupling hole 1124a and the second coupling hole 1124b are in mirror symmetry with respect to a first direction axis D1.

When it is viewed on a plan view, the first coupling hole 1124a has an L-shape, and the second coupling hole 1124b has an inversed L-shape. Each of the first and second coupling holes 1124a and 1124b includes a first area respectively corresponding to the first and second hook bases 1254 and 1264 and a second area extended from the first area. A width of the second area becomes narrow as it becomes further away from the first area. For example, the second area has a wedge shape (or V-shape) when viewed from a plan view.

A first hook 1250 corresponding to the first coupling hole 1124a and a second hook 1260 corresponding to the second coupling hole 1124b are formed through a rear surface portion of the LED module 122. The first hook 1250 includes a first hook guide 1252 protruded in a z-axis direction and a first hook base 1254 extended from the first hook guide 1252 toward an opposition direction of a second direction D2. The first hook base 1254 has a wedge shape when viewed on a plan view. The wedge shape of the first hook guide 1252 may be substantially the same as a wedge shape of the first coupling hole 1124a.

The second hook 1260 includes a second hook guide 1262 protruded in a z-axis direction and a second hook base 1264 extended from the second hook guide 1262 toward the second direction D2. The second hook base 1264 has a wedge shape when viewed on a plan view. The wedge shape of the second hook guide 1262 may be substantially the same as a wedge shape of the second coupling hole 1124b.

The first and second hook bases 1254 and 1264 are inserted into first areas of the first and second coupling holes 1124a and 1124b, respectively, to be disposed on the second areas, so that the LED module 122 may be coupled with the bottom chassis 124. For example, the first and second hook guides 1252 and 1262 are fixed by each of the second areas having a wedge shape.

After the first and second hook guides 1252 and 1262 are moved from the second area to the first area, the LED module 122 may be separated from the bottom chassis 124 through the first area.

Figure 6A:
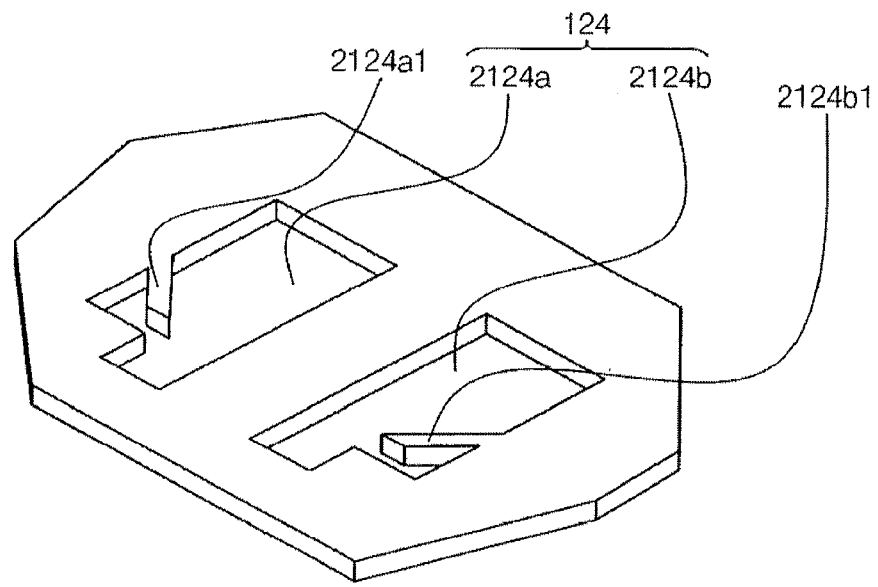
FIG. 6A is an exploded perspective view illustrating an example of a coupling hole formed through a bottom chassis of FIG. 1 and a hook member of an LED module combined with the coupling hole.
Figure 6A:
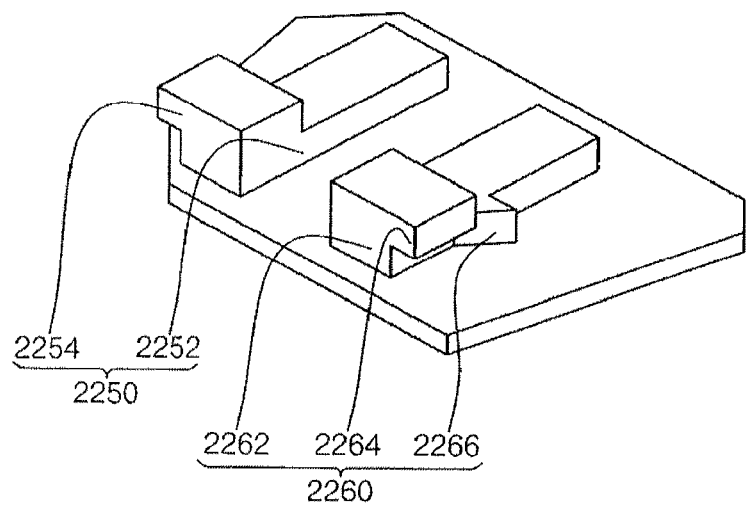
Figure 6A:
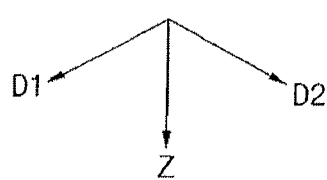
Figure 6B:
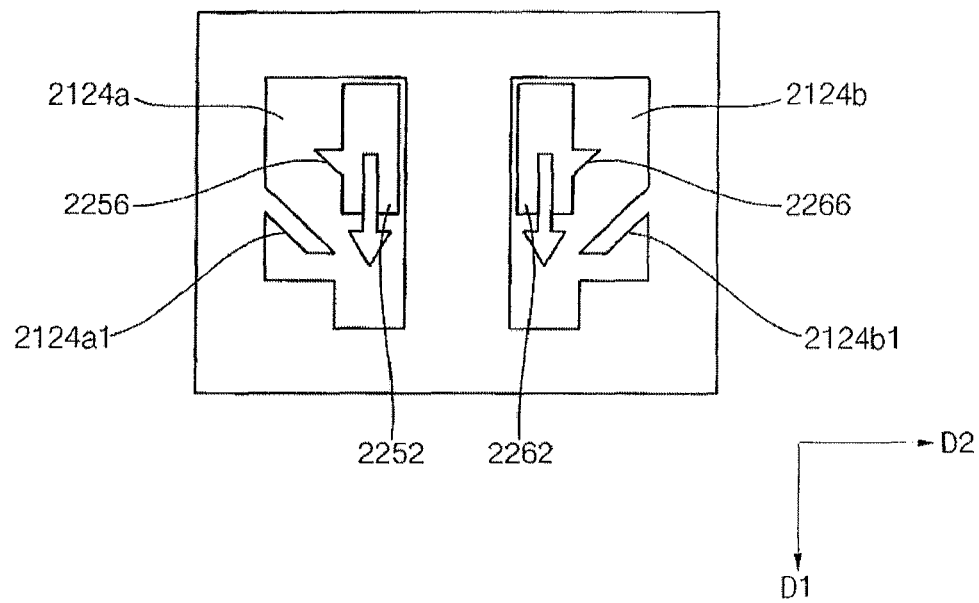
FIG. 6B is a plan view illustrating a state of the coupling hole and hook member before an LED module is fixed according to an exemplary embodiment of the present invention.
Figure 6C:
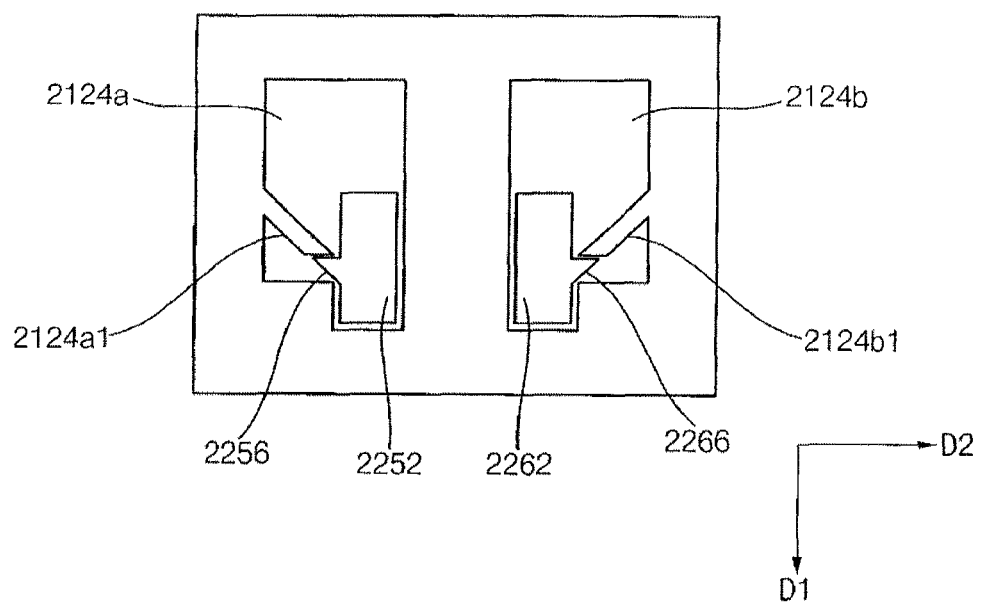
FIG. 6C is a plan view illustrating a state of the coupling hole and hook member after an LED module is fixed according to an exemplary embodiment of the present invention.

FIG. 6A is an exploded perspective view illustrating an example of a coupling hole formed through a bottom chassis of FIG. 1 and a hook member of an LED module combined with the coupling hole. FIG. 6B is a plan view illustrating a state of the coupling hole and hook member before an LED module is fixed. FIG. 6C is a plan view illustrating a state of the coupling hole and hook member after an LED module is fixed. For convenience of description, a hook base may be omitted in FIGS. 6B and 6C.

Referring to FIGS. 6A and 6B, a first coupling hole 2124a and a second coupling hole 2124b are formed through a bottom chassis 124 disposed on an xy plane that is substantially perpendicular to a z-axis. The first coupling hole 2124a and the second coupling hole 2124b are in mirror symmetry with respect to a first direction axis D1.

A first fixing protrusion 2124a1 is formed on the first coupling hole 2124a, and a second fixing protrusion 2124b1 is formed on the second coupling hole 2124b. The first fixing protrusion 2124a1 and the second fixing protrusion 2124b1 are formed to face with each other. The first fixing protrusion 2124a1 is formed at an angle of about +45 degrees with respect to a first direction axis D1, and the second fixing protrusion 2124b1 is formed at an angle of about −45 degrees with respect to the first direction axis D1. For example, an extending direction of the second fixing protrusion 2124b1 is substantially perpendicular to that of the first fixing protrusion 2124a1.

A first hook 2250 and a second hook 2260 are formed through a rear surface portion of an LED module disposed on a xy plane that is substantially perpendicular to a z-axis. The first hook 2250 and the second hook 2260 are in mirror symmetry with respect to a first direction axis D1.

The first hook 2250 includes a first hook guide 2252 and a first hook base 2254, and the second hook 2260 includes a second hook guide 2262 and a second hook base 2264.

Each of the first and second hook guides 2252 and 2262 may further include a third fixing protrusion (not shown) and a fourth fixing protrusion 2266, respectively. A protruding direction of the third protrusion of the first hook guide 2252 is different from a protruding direction of the third protrusion 2266 of the second hook guide 2262.

Each of the third and fourth fixing protrusions 2266 is inserted into the first and second coupling holes 2124a and 2124b, respectively, to be fixed by the first and second fixing protrusions 2124a1 and 2124b1, respectively.

Figure 7A:
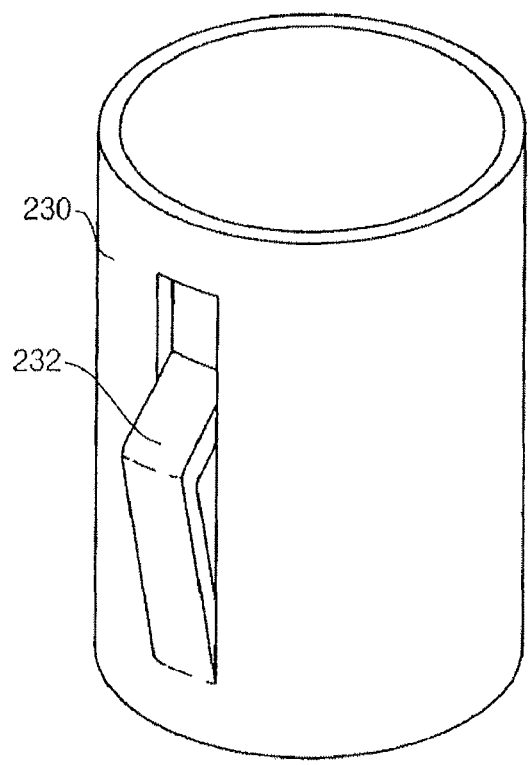
FIG. 7A is a perspective view illustrating an example of a wire socket according to an exemplary embodiment of the present invention.
Figure 7B:
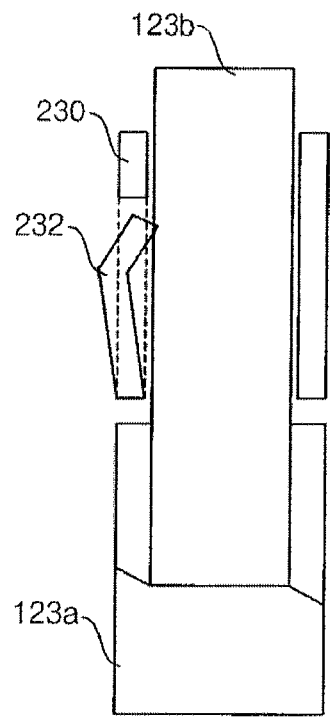
FIG. 7B is a cross-sectional view illustrating a manner in which a wire is fixed by a wire socket of FIG. 7A.

FIG. 7A is a perspective view illustrating an example of a wire socket according to an exemplary embodiment of the present invention. FIG. 7B is a cross-sectional view illustrating that a wire is fixed by a wire socket of FIG. 7A.

Referring to FIGS. 7A and 7B, a protrusion member 232 is formed at a side portion of a wire socket 230. The protrusion member 232 is opened at a portion of the wire socket 230 in U-shape to be bent toward an inner direction of a corresponding wire socket 230.

For example, a first conductive line 123b which is exposed by partially removing a portion of the first sheathing portion 123a is inserted into the wire socket 230. The first conductive line 123b which is inserted into the wire socket 230 is fixed by the protrusion member 232.

Figure 8:
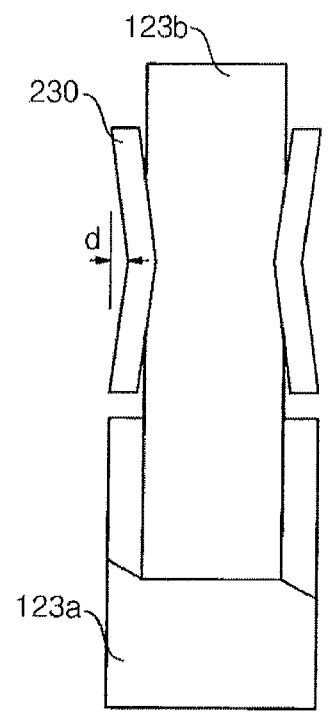
FIG. 8 is a cross-sectional view illustrating an example of a manner in which a wire is fixed by a wire socket according to an exemplary embodiment of the present invention.

FIG. 8 is a cross-sectional view illustrating an example that a wire is fixed by a wire socket according to an exemplary embodiment of the present invention.

Referring to FIG. 8A, a first conductive line 123b which is exposed by partially removing a portion of the first sheathing portion 123a is inserted into the wire socket 230. The wire socket 230 in which the first conductive line 123b is inserted is modified by being pressed, so that the first conductive line 123b is fixed within the wire socket 230.

Figure 9:
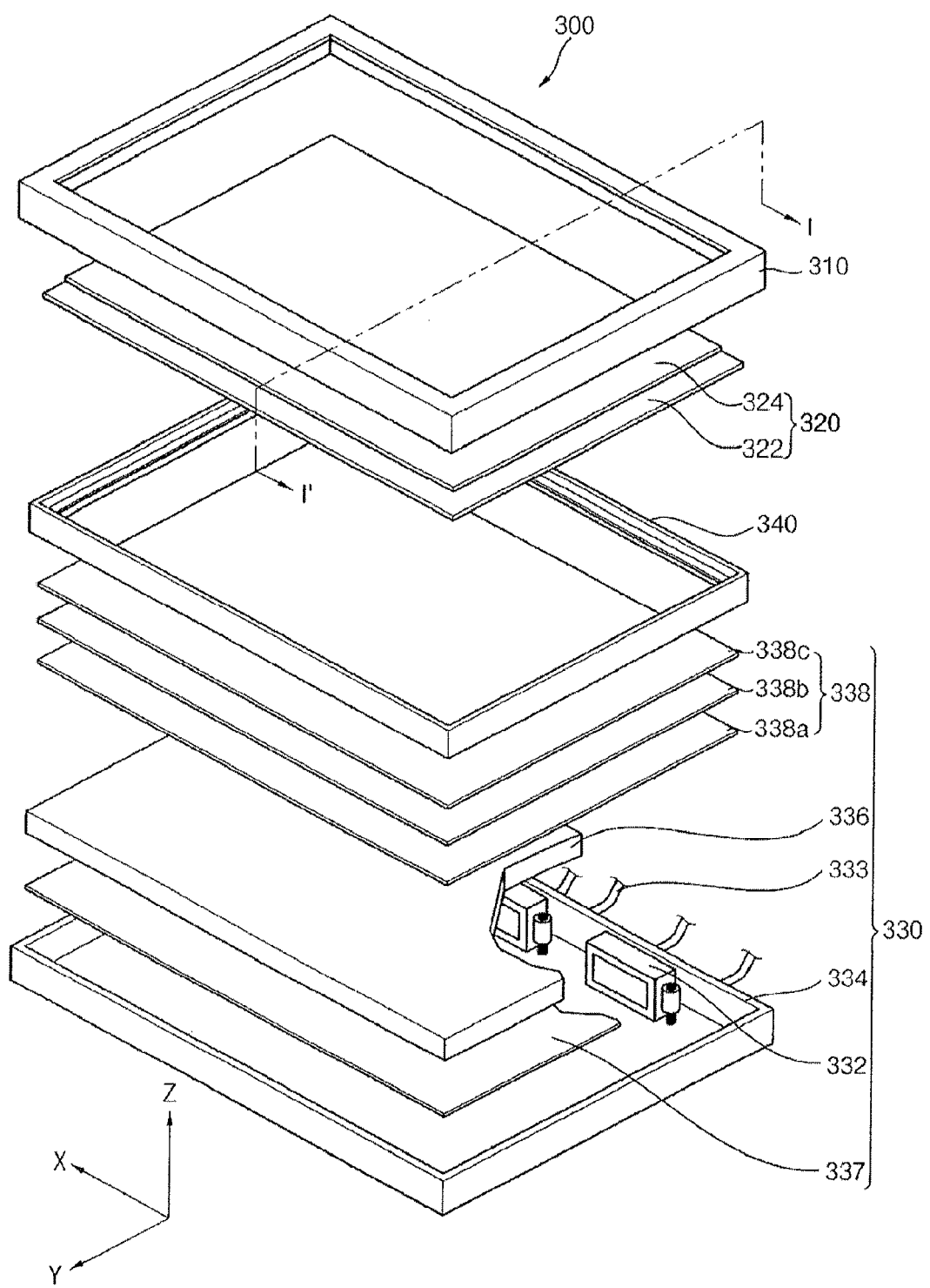
FIG. 9 is an exploded perspective view schematically illustrating a display device according to an exemplary embodiment of the present invention.
Figure 10:
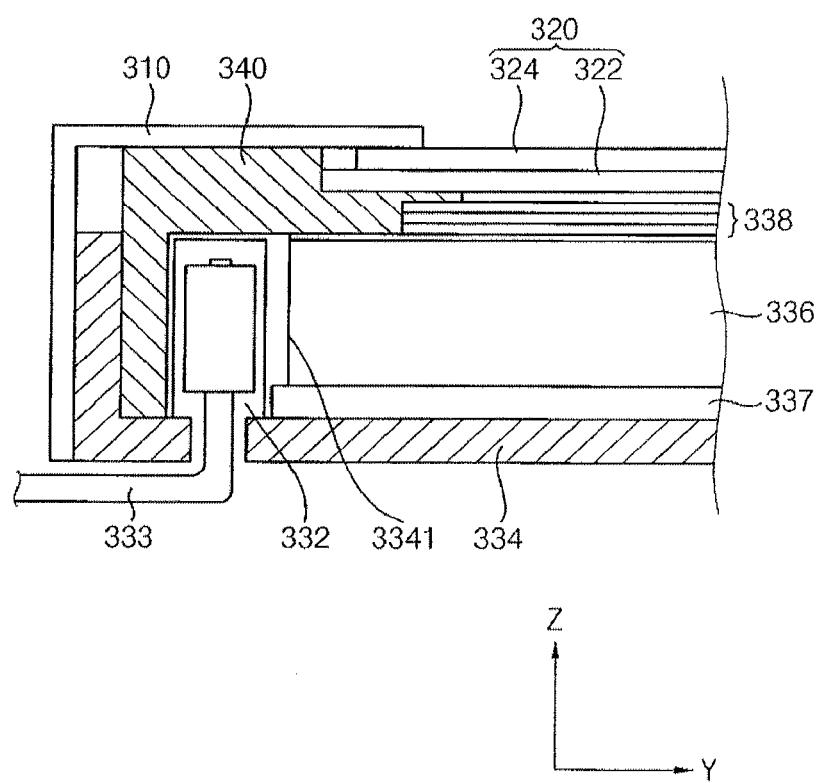
FIG. 10 is a cross-sectional view taken along a line I-I' of FIG. 9.

FIG. 9 is an exploded perspective view schematically illustrating a display device according to an exemplary embodiment of the present invention. FIG. 10 is a cross-sectional view taken along a line I-I' of FIG. 9.

Referring to FIGS. 9 and 10, a display device according to an exemplary embodiment of the present invention includes a top chassis 310, an LCD panel 320 and a backlight assembly 330.

The top chassis 310 is disposed on the LCD panel 320 to protect the LCD panel 320 from an external impact. A window is formed through the top chassis 310 to expose a display area of the LCD panel 320.

The LCD panel 320 may include a first substrate 322, a second substrate 324 facing the first substrate 322, and a liquid crystal layer (not shown) formed between the first and second substrates 322 and 324.

The backlight assembly 330 is disposed below the LCD panel 320 to provide the LCD panel 320 with light.

The backlight assembly 330 may include at least one LED module 332, a bottom chassis 334, an LGP 336, a reflection sheet 337 and one or more optical sheets 338.

The LED module 332 includes an LED package in which at least one LED chip is mounted, and first and second wire sockets respectively making contact with lead frames formed at two sides of the LED package. The LED module 332 is substantially the same as the LED module 122 of FIGS. 2 and 3, and thus a detailed description thereof will be omitted.

A wire 333 is connected to the LED modules 332 to receive power from an external power supplying device (not shown), and the LED modules 332 emit light in response to the received power. The LED modules 332 may be formed at least one side surface of the LGP 336. For example, the LED modules 332 may be formed at a first side surface of the LGP 336 which corresponds to a direction parallel with a long side of the LCD panel 320. Alternatively, the LED modules 332 may be formed at a first side surface or two side surfaces of the LGP 336 which corresponds to a direction parallel with a short side of the LCD panel 320.

The bottom chassis 334 includes a bottom portion and plural sidewalls extended from edges of the bottom portion to form a receiving space. The bottom chassis 334 receives the reflection sheet 337, the LGP 336, the LED modules 332 and the optical sheets 338. The LED modules 332 may be disposed on a first sidewall of the bottom chassis 334. Alternatively, the LED modules 332 may be disposed on the bottom portion of the bottom chassis 334. At least one coupling hole for coupling the LED module 334 may be formed through the bottom portion of the bottom chassis 334. Moreover, at least one wire hole for penetrating a wire providing power to the LED module 332 may be formed through the bottom portion of the bottom chassis 334.

The LGP 336 is disposed at a first side of the LED modules 332 and guides light emitted from the LED module 332 to provide the optical sheets 338 with the guided light. The LGP 336 has a substantially plate-like shape. Thus, the LGP 336 includes four side surfaces, an upper surface and a lower surface to define a hexahedron. A side surface in which the LED module 332 is disposed may define a light incident surface 3341. The light incident surface 3341 may include one or more distinct surfaces. In the present exemplary embodiment, the LED modules 332 are disposed at a light incident surface 3341 corresponding to one long side of the four side surfaces. Although not shown in FIG. 9, a plurality of grooves may be formed in the light incident surface 3341. One groove may correspond to one LED module.

The LGP 336 includes a polymer resin having various characteristics such as a high light transmittance, a high heat resistance, a high chemical resistance, a high mechanical strength, etc. Examples of the polymer resin that may be used for the LGP 336 may include polymethylmethacrylate, polyamide, polyimide, polypropylene, polyurethane, etc. These may be used alone or in a combination thereof.

The reflection sheet 337 is disposed below the LGP 336 to reflect light leaked from the LGP 336.

The optical sheets 338 are disposed on the LGP 336 and increase an efficiency of light incident from the LGP 336. The optical sheets 338 may include a diffusion sheet 338a, a first prism sheet 338b, and a second prism sheet 338c.

The display device 300 may further include a mold frame 340. The mold frame 340 is disposed between the LCD panel 320 and the optical sheets 338 to support the LCD panel 320 together with the bottom chassis 334. The mold frame 340 may fix the LGP 336, the optical sheets 338 and the reflection sheet 337 to the bottom chassis 334.

In FIG. 9, it is shown that the wires are respectively penetrated through two wire holes formed through a bottom portion of the bottom chassis 334, so that the LED module is connected to an external power supplying device through the wires. Alternatively, when the power supplying device is disposed at the bottom chassis 334, the two wire holes may be omitted.

Moreover, in FIG. 9, two coupling holes for connecting the LED and two wire holes for providing power are formed through the bottom chassis in correspondence with one LED module. Alternatively, two coupling holes for connecting the LED and one wire hole for providing power may be formed through the bottom chassis.

According to an exemplary embodiment of the present invention, an LED module is directly coupled to a bottom chassis of a backlight assembly in correspondence with a first side portion (or a long side) of an LGP, so that a PCB or an FPCB that is equipped to provide an LED with power may be omitted. Thus, a manufacturing cost of a backlight assembly or a display device may be reduced.

Moreover, a hook member is disposed on an LED module so as to couple the LED module and the bottom chassis, so that heat generated from the LED module may be irradiated or otherwise transmitted to the bottom chassis through the hook member.

As described above, according to an exemplary embodiment of the present invention, a wire socket is configured to make contact with a lead frame formed at a side portion of an LED package and power is received through a wire inserted through the wire socket, so that an additional PCB or an additional FPCB for providing the LED package with power may be omitted. Therefore, a manufacturing cost of a backlight assembly or a display device may be reduced.

Moreover, a hook member is disposed on an LED module so as to directly couple the LED module and a bottom chassis, so that heat generated from the LED module may be irradiated or otherwise transmitted to the bottom chassis through the hook member.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the present invention.

What is claimed is:

1. A light-emitting diode (LED) module comprising:
   an LED package for providing a backlight to a display panel, said LED package including at least one LED chip mounted therein;
   a first wire socket making contact with a first frame formed at a first side of the LED package and a second wire socket making contact with a second frame formed at a second side of the LED package, wherein the first wire socket is configured to receive a first wire entirely therethrouth and the second wire socket is configured to receive a second wire entirely therethrough; and
   a hook member disposed below the LED package, wherein the hook member is aligned substantially in parallel with the first wire socket, the first wire, the second wire socket, and the second wire.

2. The LED module of claim 1, wherein the hook member comprises:
   a first hook adjacent to the first wire socket; and
   a second hook adjacent to the second wire socket.

3. The LED module of claim 2, wherein the first hook comprises:
   a first hook guide formed toward a downward direction of the LED package; and
   a first hook base connected to an end portion of the first hook guide, the first hook base being extended toward the first wire sock in parallel with a rear surface of the LED package, and
   the second hook comprises:
   a second hook guide formed toward a downward direction of the LED package; and
   a second hook base connected to an end portion of the second hook guide, the second hook base being extended toward the second wire sock in parallel with a rear surface of the LED package.

4. The LED module of claim 3, wherein each of the first and second hook guides has a wedge shape.

5. The LED module of claim 3, wherein the first hook guide further comprises a first protrusion protruded toward the first wire socket, and the second hook guide further comprises a second protrusion protruded toward the second wire socket.

6. The LED module of claim 1, wherein a protrusion member extends from a portion of each of the first and second wire sockets, said protrusion having a U-shape to be bent toward an inner direction of the corresponding wire socket.

7. A backlight assembly comprising:
   a light-emitting diode (LED) module comprising:
   an LED package in which at least one LED chip is mounted; and first and second wire sockets respectively making contact with first and second frames formed at two sides of the LED package, and a bottom chassis having a coupling hole formed through a bottom portion thereof for receiving a coupling hook of the LED module, wherein the first wire socket is configured to receive a first wire entirely therethrough and the second wire socket is configured to receive a second wire entirely therethrough, and wherein the coupling hook is aligned substantially in parallel with the first wire socket, the first wire, the second wire socket, and the second wire.

8. The backlight assembly of claim 7, further comprising:
a light guide plate disposed at a side portion of the LED module,
wherein the LED module is disposed at a first side of the light guide plate.

9. The backlight assembly of claim 7, further comprising:
a light guide plate disposed at a side portion of the LED module,
wherein an edge portion of the light guide plate is chamfered to define a light incident portion, and the LED module is disposed at the light incident portion.

10. The backlight assembly of claim 7, wherein a first wire hole and a second wire hole are formed through the bottom portion of the bottom chassis to accommodate the first wire and the second wire that are inserted into the first and second wire sockets, respectively.

11. The backlight assembly of claim 7, wherein the coupling hole has an L-shape.

12. The backlight assembly of claim 7, wherein the coupling hole includes a first coupling hole and a second coupling hole, and wherein the first coupling hole and the second coupling hole are in mirror symmetry.

13. The backlight assembly of claim 7, wherein the coupling hook of the LED module comprises: a first hook adjacent to the first wire socket; and a second hook adjacent to the second wire socket,
wherein the first hook comprises a first hook guide formed toward a downward direction of the LED package, and the second hook comprises a second hook guide formed toward a downward direction of the LED package, and
wherein the first hook guide comprises a first protrusion protruded toward the first wire socket, and the second hook guide comprises a second protrusion protruded toward the second wire socket.

14. The backlight assembly of claim 7, wherein each side portion of the first and second wire sockets is configured to affix to a conductive line respectively inserted into the first and second wire sockets.

15. A backlight assembly comprising:
a light-emitting diode (LED) module comprising:
an LED package in which at least one LED chip is mounted; and
first and second wire sockets respectively making contact with first and second frames formed at two sides of the LED package, and a bottom chassis having a coupling hole formed through a bottom portion thereof for receiving a coupling hook of the LED module,
wherein a first coupling hole and a second coupling hole are formed through the bottom chassis, each of the first and second coupling holes includes a first area and a second area extended from the first area, and a width of the second area narrowing at locations further away from the first area, wherein a first hook comprising a first hook guide and a first hook base and a second hook comprising a second hook guide and a second hook base are formed on a rear surface portion of the LED module, and wherein each of the first and second hook guides is respectively inserted into the second areas of the first and second coupling holes.

16. The backlight assembly of claim 7, wherein a first coupling hole and a second coupling hole are formed through the bottom chassis, and a first fixing protrusion and a second fixing protrusion are formed in correspondence with the first and second coupling holes, wherein a first hook comprising a first hook guide and a first hook base and a second hook comprising a second hook guide and a second hook base are formed on a rear surface portion of the LED module, wherein each of the first and second hook guides further comprises a third fixing protrusion and a fourth fixing protrusion that are protruded in the different direction, and wherein each of the third and fourth fixing protrusions is respectively inserted into the first and second coupling holes to be fixed by the first and second fixing protrusions.

17. A display device comprising:
a liquid crystal display (LCD) panel; and a backlight assembly providing the LCD panel with light, the backlight assembly comprising:
a light-emitting diode (LED) module comprising:
an LED package in which at least one LED chip is mounted; and
first and second wire sockets respectively making contact with first and second frames formed at two sides of the LED package, and a bottom chassis having a coupling hole formed therethrough for receiving a coupling hook of the LED module,
wherein the first wire socket is configured to receive a first wire entirely therethrough and the second wire socket is configured to receive a second wire entirely therethrough, and
wherein the coupling hook is aligned substantially in parallel with the first wire socket, the first wire, the second wire socket, and the second wire.

18. The display device of claim 17, wherein the coupling hook of the LED module is disposed below the LED package.

19. The display device of claim 17, wherein the backlight assembly further comprises a light guide plate disposed at a side portion of the LED module, wherein an edge portion of the light guide plate is chamfered to define a light incident portion, and the LED module is disposed at the light incident portion.

20. A backlight assembly comprising:
a light emitting diode (LED) package for providing light including at least one LED chip mounted therein;
a first wire socket mounted to a first side of the LED package and a second wire socket mounted to a second side of the LED package;
at least one coupling hook disposed below the LED package; and
at least one coupling hole disposed in a bottom chassis of the backlight assembly for receiving the at least one coupling hook of the LED package,
wherein when the coupling hook of the LED package is inserted into the coupling hole of the bottom chassis of the backlight assembly, a first wire is received by the first wire socket and a second wire is received by the second wire socket and the LED package is brought into close proximity to a light guide plate,
wherein the first wire socket is configured to receive the first wire entirely therethrough and the second wire socket is configured to receive the second wire entirely therethrough, and wherein the coupling hook is aligned substantially in parallel with the first wire socket, the first wire, the second wire socket, and the second wire.

* * * * *